United States Patent Office 3,155,114
Patented Nov. 3, 1964

3,155,114
DIRECTIONAL CONTROL VALVE WITH FLOW
CONTROL AND CHECK VALVE UNIT
Charles A. L. Ruhl, Wheaton, Ill., assignor to The New
York Air Brake Company, a corporation of New
Jersey
Filed May 17, 1963, Ser. No. 281,237
4 Claims. (Cl. 137—596.2)

This invention relates to directional control valves for controlling the flow of fluid to and from hydraulic motors of the double-acting type.

It is known that in some installations in which these hydraulic motors are used, the exernal loads applied to the motor frequently are large enough to cause it to move at a rate faster than that with which the pump can keep pace. When this happens, the motor cavitates and the operator loses control. A common solution to this problem consists generally of a flow control valve that is positioned in the return path from the contracting side of the motor to the reservoir and which restricts this path an amount that varies inversely with the pressure of the fluid supplied to the opposite side of the motor. When the flow demand of the motor exceeds the capacity of the pump, supply pressure decreases and the flow control valve moves in the closing direction to increase the restriction to flow from the contracting chamber of the motor. As a result the motor is slowed down and cavitation in the expanding side is prevented.

Another problem encountered in this art is that of preventing unintentional dropping of the load supported by the motor. This problem arises when the control valve is in an actuating position and the pump fails or is stopped or the supply line is ruptured. It also arises in those cases in which the motor is loaded when the control valve is accidentally shifted from its "hold" position to an actuating position. One well known scheme for solving this problem is disclosed in Stephens Patent 2,359,802 granted October 10, 1944, and involves the use of a load drop check valve which is mounted in the internal bore of a hollow valve plunger. This check valve is positioned in the supply path leading to the motor chamber which is being contracted by the load upon shifting of the valve plunger from it neutral position, and serves to prevent flow from that chamber.

The prior art also discloses a scheme in which the functions of both the flow control valve and the load drop check valve are performed by a single valve unit mounted in the axial bore of a hollow valve plunger. Such an arrangement is the subject of Hodgson Patent 2,710,628, issued June 14, 1955. While the mechanism shown in this Hodgson patent is satisfactory from the standpoint of performance, it is extremely difficult to manufacture. This difficulty stems from the fact that in the illustrated embodiment of the Hodgson invention, which uses a pair of flow control-check valve units that abut opposite ends of a centrally located floating piston, the valve unit which is serving as a check valve is opened directly by supply pressure, whereas the unit which is serving as the flow control valve is opened indirectly through the medium of the floating piston. This arrangement requires a pair of crossed passages that serve to selectively vent and pressurize the regions between the opposite ends of the floating piston and the abutting ends of the two valve units. In one embodiment of the patent, these crossed passages are defined by slots formed in the outer periphery of a cylinder centered in the axial bore of the valve plunger. This cylinder must be soldered or brazed in place, and that operation, with the accompanying heating of the parts, causes warpage. As a result, some dead-end honing is required. Furthermore, this construction requires great care in positioning the cylinder in the axial bore because the slots in its outer periphery must register with lateral through ports in the valve plunger. In the second embodiment, illustrated in the patent, the crossed passages are defined by drilled bores whose axes form an angle considerably less than 90° with the plunger axis. Drilling of holes such as this is not practical using current manufacturing techniques.

The object of this invention is to provide a combined flow control and check valve unit for a hollow valve plunger having the functional advantages of the arrangement disclosed in Patent 2,710,628 and which can be manufactured easily using conventional production techniques. The so-called "double-ended" version of the present invention, i.e., the version in which a pair of valve units is used, employs a floating piston whose opposite ends abut the valve units as in the patented construction, but, in this case, the unit which serves as the check valve is actuated indirectly by supply pressure through the floating piston and the unit that is serving as the flow control valve is opened directly by the supply pressure. This change in the manner of actuating the valves eliminates the need for crossed passages and permits the use of passages that are normal to the plunger axis to selectively connect the opposite ends of the floating piston with supply and exhaust. As a result, this scheme, unlike the one shown in Patent 2,710,628, requires no brazed cylinders or oblique holes and can be made easily by standard production techniques.

The present invention also provides a "single-ended" version of the flow control-check valve unit which employs only one unit. In this case, the unit is opened directly by supply pressure when it is serving as a check valve and indirectly through the floating piston when it is serving as a flow control valve. However, unlike the design shown in Patent 2,710,628, which also uses this mode of actuating the valve unit, the "single-ended" version of the present invention employs an arrangement of ports along the valve bore that permits the use of lateral through ports in the plunger for the purpose of selectively venting and pressurizing the opposite ends of the floating piston.

In each embodiment, the flow control-check valve unit takes the form of a simple tubular valve member having a closed end that abuts the floating piston and containing a set of lateral through ports that are moved into and out of registration with one of the lateral through ports in the valve plunger as the valve unit moves in the opening and closing directions, respectively. This unit is less expensive and easier to construct than the one employed in Patent 2,710,628.

The preferred embodiment of the invention will be described herein with reference to the accompanying drawings in which.

Figure 1:
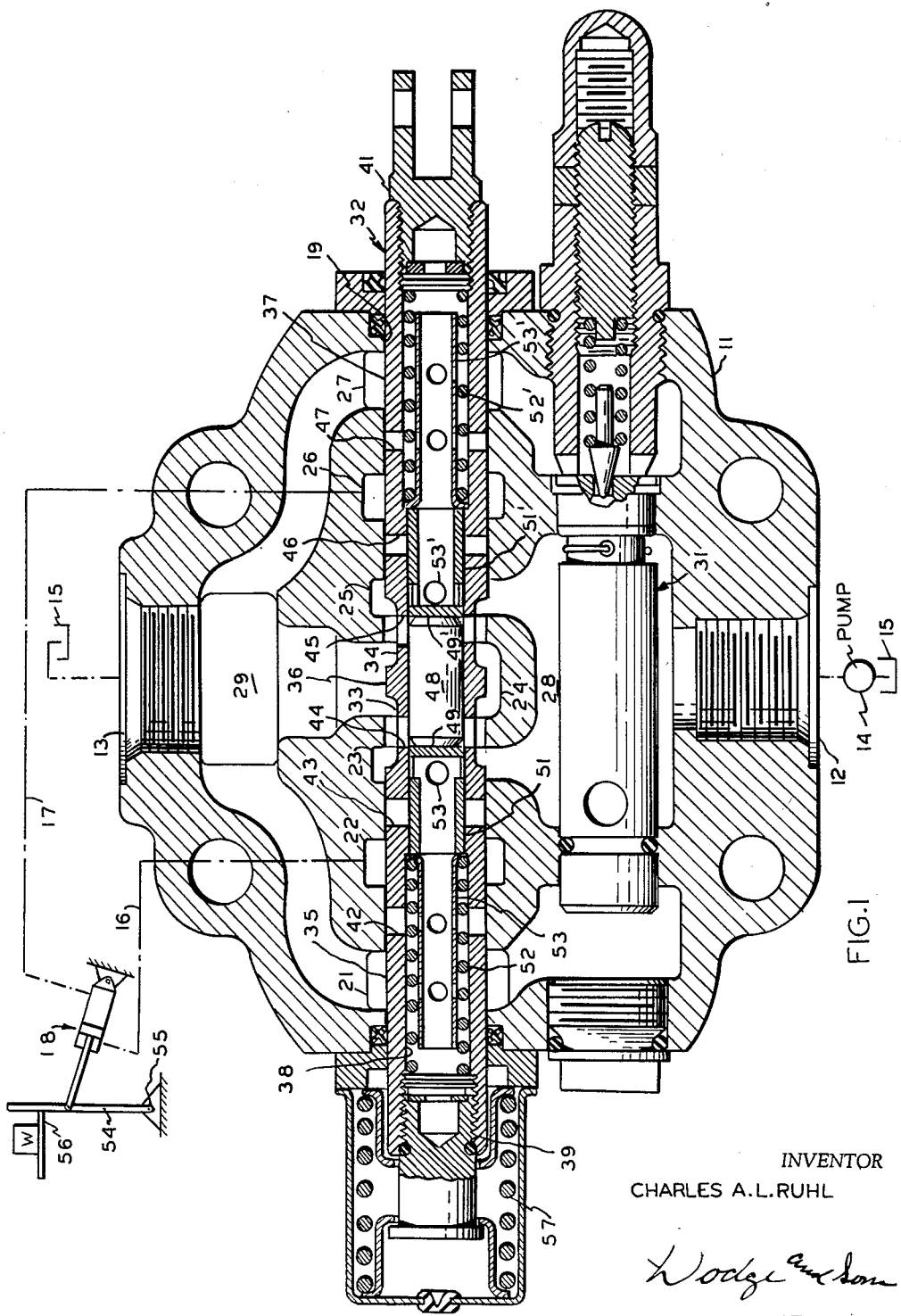
FIG. 1 is a sectional view of a directional control valve incorporating the "double-ended" version of the subject invention and including, in schematic form, the system components with which it is used.

As shown in FIG. 1, the directional control valve comprises a housing 11 containing inlet and exhaust ports 12 and 13 which are connected with the pump 14 and reservoir 15, respectively, and two motor ports (not shown) which are connected by conduits 16 and 17 with the opposite sides of a double-acting piston motor 18. Extending through the housing 11 is a valve bore 19 that is encircled by seven longitudinally spaced annular chambers 21–27. Annular chambers 23 and 25 are connected with inlet port 12 by a branched supply passage 28, chambers 21, 24 and 27 are connected with exhaust port 13 by exhaust manifold 29, and chambers 22 and 26 are connected with the two motor ports. A conventional pilot-operated relief valve 31 limits the pressure in supply passage 28 by by-passing fluid to exhaust manifold 29.

Mounted in valve bore 19 is a reciprocable valve plunger 32 formed with two annular grooves 33 and 34 that define three valve lands 35, 36, and 37. Valve plunger 32 is formed with a through axial bore 38 whose opposite ends are closed and sealed by threaded plugs 39 and 41 and which is intersected by six longitudinally spaced sets of radial passages 42–47. A floating piston 48 is centered in the bore and so dimensioned that its opposite ends are positioned in the regions of passages 44 and 45. The sliding fit between piston 48 and bore 38 is sufficiently close to define an effective fluid seal between the portions of the axial bore at its opposite ends. The left end of piston 48 abuts the end 49 of a tubular flow control and check valve 51 which reciprocates in axial bore 38 and is urged into contact with piston 48 by a coil compression spring 52. A sleeve 53, having an outturned flange that rests against the left end of valve 51, stabilizes spring 52 by preventing buckling. Valve 51 is provided with a set of radial passages 53 which is arranged to move into and out of registration with radial passages 43 as the valve moves to the left and right, respectively, in bore 38. The portion of bore 38 to the right of piston 48 contains an identical tubular flow control and check valve 51'.

The "double-ended" version of the invention shown in FIG. 1 is used in those installations where the double-acting motor 18 which is being controlled is subjected to reversible loads. The mast tilt motor on a lift truck is one type of motor which encounters loads of this type. As shown schematically in FIG. 1, the mast 54 is pivoted at 55 and carries a fork 56 that supports the load W. The mast is tilted in opposite directions above pivot 55 by motor 18 and as the center of gravity of load W passes through a vertical plane containing pivot 55 the direction of the force it exerts on motor 18 reverses.

When valve plunger 32 of the directional control valve is in the illustrated neutral position, pump 14 is unloaded to reservoir 15 through the open center flow path comprising inlet port 12, branched supply passage 28, annular chambers 23 and 25, plunger grooves 33 and 34, annular chamber 24, exhaust manifold 29 and exhaust port 13. In this position lands 35 and 37 isolate annular chambers 22 and 26, respectively, from the other chambers so double-acting motor 18 is hydraulically locked.

In order to tilt mast 54 in the clockwise direction about pivot 55, the operator shifts valve plunger 32 to the right against the opposing bias of centering spring 57 to a second position in which radial passages 42–47 register, respectively, with annular chambers 22–27, and lands 35 and 36 interrupt communication between annular chambers 23 and 25 and chamber 24 and thus close the unloading path. Fluid at system pressure now passes into the space between the right end of piston 48 and the end 49' of valve 51' where it is effective directly to open valve 51' and indirectly, through piston 48, to open valve 51. This action opens a supply path to the rod end of motor 18 comprising inlet port 12, branched supply passage 28, annular chamber 23, radial passages 43 and 53, the interior of tubular valve 51, axial bore 38, radial passages 42, annular chamber 22 and conduit 16. Simultaneously, the head end of motor 18 is vented to reservoir 15 along an exhaust path comprising conduit 17, annular chamber 26, radial passages 46 and 53', the interior of tubular valve 51', axial bore 38, radial passages 47, annular chamber 27, exhaust manifold 29 and exhaust port 13. Motor 18 now commences to tilt mast 54, and when the mast reaches the desired position, the operator releases plunger 32 and allows centering spring 57 to return it to neutral position. It will be apparent that return of the plunger 32 to neutral position interrupts the supply and exhaust paths, re-opens the open center unloading path, and again produces a hydraulic lock at motor 18.

If, when valve plunger 32 is in the second position, the center of gravity of load W passes through the vertical plane containing pivot 55 and the load W commences to move motor 18 at a rate greater than that with which the pump 14 can keep pace, the supply pressure in branched supply passage 28 and in the space between the right end of piston 48 and the end 49' of tubular valve 51' will decrease. As a result, valve 51' will move in the closing direction and restrict the flow of fluid returning to reservoir 15 through radial passages 46. This action retards movement of motor 18 and, since the magnitude of the restriction created by valve 51' varies inversely with supply pressure, motor speed will be limited to that value at which motor flow demand equals pump delivery rate. Since, during conditions of incipient cavitation, the pressure in the supply path to motor 18 downstream of tubular valve 51 is usually less than the pressure in the exhaust path downstream of valve 51', valve 51 will remain open even though supply pressure decreases. However, even if valve 51' closes slightly, this action does not affect the motion-retarding effect of valve 51'.

It will be observed that tubular valve 51 performs the functions of the conventional load drop check valve when valve plunger 32 is in or is shifted toward the second position. Thus, if mast 54 is in the illustrated position in which the center of gravity of load W is located to the left of the vertical plane containing pivot 55 and the load tends to contract the rod end of motor 18, the resulting load pressure in conduit 16 and in annular chamber 22 is ineffective to open valve 51. This valve opens only when supply pressure exceeds load pressure and, therefore, it prevents unintentional dropping of load W under all conditions.

In order to move mast 54 in the counterclockwise direction about pivot 55, the operator shifts valve plunger 32 to the left from the neutral position to a third position in which radial passages 42–47 register, respectively, with annular chambers 21–26, and lands 36 and 37 close the open center unloading path. In this case, supply pressure is transmitted to the space between the left end of piston 48 and the end 49 of valve 51 through annular chamber 23 and radial passages 44. The supply pressure acts directly upon end 49 and develops a force that opens valve 51. Valve 51', on the other hand, is opened indirectly by the force developed on the left end of piston 48. Movement of these valves opens a supply path to the head end of motor 18 including branched passage 28, annular chamber 25, radial passages 46 and 53', the interior of tubular valve 51', radial passages 47, annular chamber 26 and conduit 17, and an exhaust path from the rod end of this motor to reservoir 15 including conduit 16, annular chamber 22, radial passages 43 and 53, the interior of tubular valve 51, radial passages 42, annular chamber 21, exhaust manifold 29 and exhaust port 13. As in the previous cases, stopping of motor 18 is effected by releasing plunger 32 and allowing centering spring 57 to return it to neutral position.

When valve plunger 32 is in the third position, the functions of the valves 51 and 51' are reversed; valve 51 serving as the flow control valve and valve 51' serving as the load drop check valve. Thus, if the center of gravity of load W is on the left side of the vertical plane containing pivot 55 and the load W is large enough to cause motor 18 to run away, supply pressure decreases and valve 51 moves in the closing direction. The resulting increase in flow restriction at radial passages 43 prevents motor 18 from moving at an excessive rate and consequently insures that the head end of the motor is maintained liquid filled. When the center of gravity of the load W is on the right side of the aforementioned vertical plane and the load W tends to contract the head end of the motor, valve 51' prevents escape of the load pressure in annular chamber 26 and consequently insures against dropping of the load.

In some cases, for example, a simple lift or hoist, the load imposed on the double-acting motor is uni-directional. In these cases, the "single-ended" version of the invention shown in FIG. 2 may be used. As shown in this figure, the directional control valve includes a housing 11a containing inlet and exhaust ports 12a and 13a, which are connected with pump 14a and reservoir 15a, respectively, a pair of motor ports (not shown) which are connected with the opposite sides of motor 18a via conduits 16a and 17a, and through valve bore 19a which is encircled by six longitudinally spaced annular chambers 21a, 22a, 23a, 25a, 26a and 27a. Chambers 21a, 25a and 27a are connected with the exhaust port 13a by an exhaust manifold 29a, chamber 23a is connected with inlet port 12a by a supply passage 28a, and chambers 22a and 26a are connected with the two motor ports. Valve bore 19a contains a three-position hollow valve plunger 32a formed with an annular groove 33a that defines two lands 35a and 37a. Extending through valve plunger 32a is an axial bore 38a whose opposite ends are closed and sealed by threaded plugs 39a and 41a and which is intersected by five longitudinally spaced sets of radial passages 42a, 43a, 44a, 45a and 47a. As in the case of the FIG. 1 embodiment, the valve plunger 32a of FIG. 2 contains a floating piston 48a and a flow control and check valve unit 51a. However, in lieu of a second flow control and check valve unit, this embodiment employs a conventional check valve 58 and a stop pin 59 which is mounted in two of the four radial passages 45a.

Figure 2:
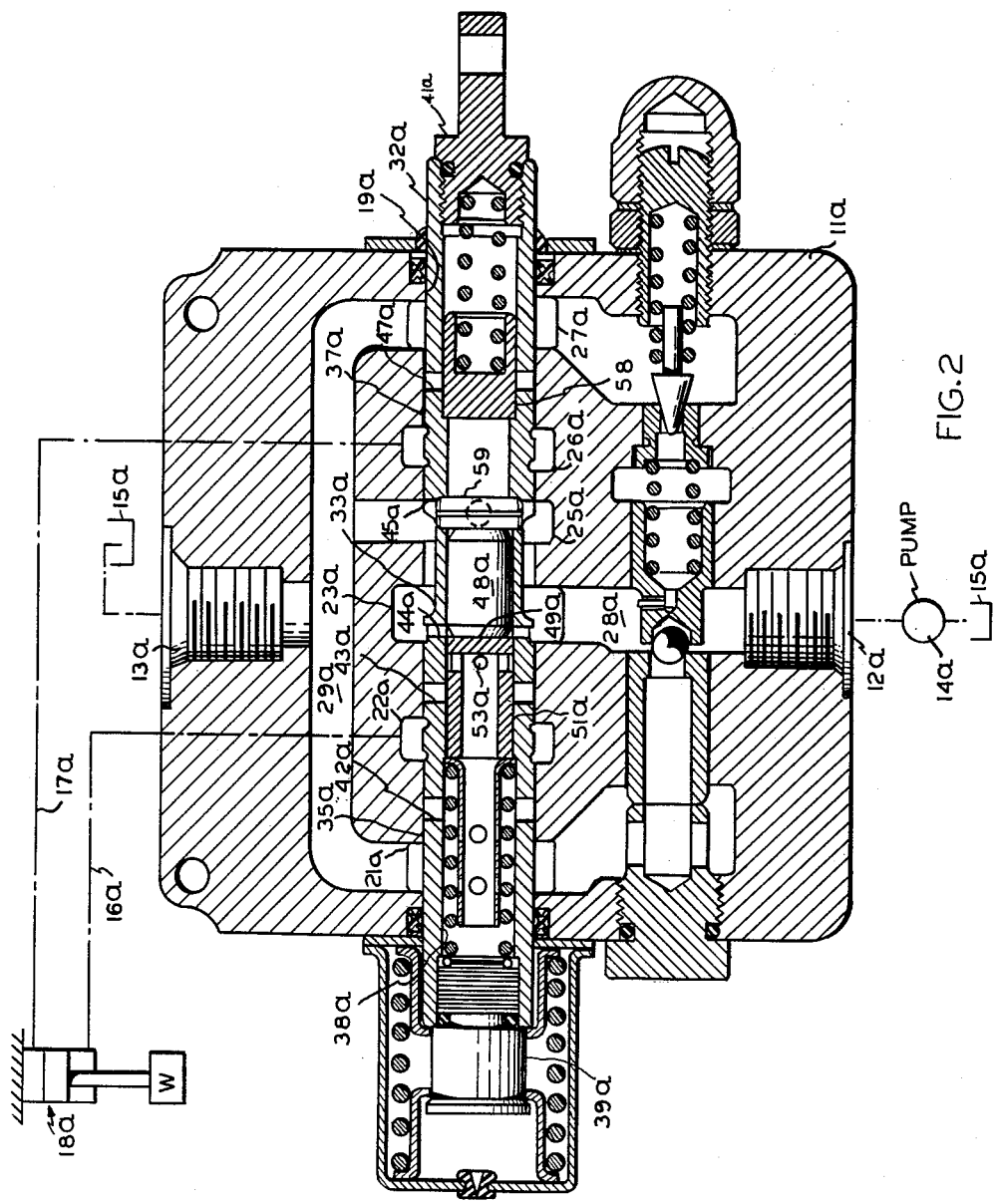
FIG. 2 is a sectional view of a directional control valve incorporating the "single-ended" version of the subject invention and including, in schematic form, the system components with which it is used.

When the valve plunger 32a of FIG. 2 is in the illustrated neutral position, lands 35a and 37a isolate annular chambers 22a and 26a, respectively, from the other chambers, and thus hydraulically lock motor 18a, and groove 33a interconnects chambers 23a and 25a and thus establishes an open center unloading path for pump 14a. When the valve plunger 32aa is shifted to the right to the "raise" position, land 35a closes the unloading path, radial passages 42a register with annular chamber 22a, radial passages 43a and 44a register with annular chamber 23a, and radial passages 45a and 47a register with annular chambers 26a and 27a, respectively. Supply pressure transmitted to the space between the left end of piston 48a and the end 49a of valve 51a through radial passages 44a shifts valve 51a to the open position in which radial passages 53a register with radial passages 43a. This action opens a supply path to the rod end of motor 18a including annular chamber 23a, radial passages 43a and 53a, the interior of tubular valve 51a, radial passages 42a, annular chamber 22a, and conduit 16a. As motor 18a moves the load W upward, the fluid displaced from the head end of motor 18a passes to reservoir 15a along an exhaust path including conduit 17a, annular chamber 26a, radial passages 45a, check valve 58, radial passages 47a, annular chamber 27a, exhaust manifold 29a, and exhaust port 13a. In this "raise" position, valve 51a is serving as a load drop check valve and prevents dropping of load W upon failure of supply pressure.

In order to lower load W, the operator shifts valve plunger 32a to the left from the neutral position to the "lower" position in which radial passages 42a, 43a and 47a register with annular chambers 21a, 22a and 26a, respectively, radial passages 45a are connected with annular chambers 23a through plunger groove 33a, radial passages 44a are closed by the fixed land between chambers 22a and 23a, and land 37a closes the open center unloading path. Fluid now is supplied to the head end of motor 18a through a supply path including annular chamber 23a, groove 33a, radial passages 45a, check valve 58, radial passages 47a, annular chamber 26a and conduit 17a. Supply pressure acting on the right end of piston 48a causes this member to open valve 51a so that the fluid displaced from the rod end of motor 18a during downward movement is conveyed to reservoir 15a through conduit 16a, annular chamber 22a, radial passages 43a and 53a, the interior of tubular valve 51a, radial passages 42a, annular chamber 21a, exhaust manifold 29a and exhaust port 13a. If load W is large enough to produce a runaway condition, the supply pressure decreases and valve 51a moves in the closing direction and increases the flow restriction at radial passages 43a and 53a. The action of valve 51a is such that motor 18a always moves at a rate determined by the capacity of pump 14a.

As mentioned previously, the drawings and description relate only to the preferred embodiments of the invention. Since changes can be made in the structures of these embodiments without departing from the inventive concept, the following claims should provide the sole measure of the scope of the invention.

What is claimed is:

1. In a directional control valve of the sliding plunger type including a housing containing a valve bore having a central exhaust chamber, a pair of end exhaust chambers, a motor chamber located between each end exhaust chamber and the central exhaust chamber, and a supply chamber located between each motor chamber and the central exhaust chamber, and a valve plunger slidable in the valve bore and containing an axial bore intersected by four longitudinally spaced lateral ports extending through the valve plunger, the plunger having a first position in which the first and second lateral ports register with one supply and one motor chamber, respectively, and the third and fourth lateral ports register with the other motor chamber and one end exhause chamber, respectively, a second position in which the first and second lateral ports register with said one motor chamber and the other end exhaust chamber, respectively, and the third and fourth lateral ports register with the other supply chamber and the other motor chamber, respectively, and a mid position in which the four lateral ports are isolated from the chambers, a reciprocable piston actuator in said axial bore, first and second flow control-check valve units mounted in said axial bore in abutment with opposite ends of the piston actuator, the first unit controlling communication between the first and second lateral ports and the second unit controlling communication between the third and fourth lateral ports, and springs biasing the valve units toward the piston actuator, the improvement which comprises (a) a fifth lateral through port formed in the valve plunger and opening into the axial bore in the region of the abutting ends of the piston actuator and the first valve unit; and (b) a sixth lateral through port formed in the valve plunger and opening into the axial bore in the region of the abutting ends of the piston actuator and the second valve unit, (c) the fifth and sixth lateral ports being so positioned that in the first position of the valve plunger the sixth port registers with the said other supply chamber, and in the second position the fifth lateral port registers with the said one supply chamber.

2. The improvement defined in claim 1 in which (a) each valve unit comprises a tubular valve element having one closed end that abuts the actuating piston and containing at least one lateral through port, (b) the through ports of the first and second units being movable into and out of registration with the first and third lateral ports, respectively, as the units reciprocate in said axial bore.

3. A directional control valve comprising (a) a housing containing a valve bore having a central exhaust chamber, a pair of end exhaust chambers, a motor chamber located between each end exhaust chamber and the central exhaust chamber, and a supply chamber located between the central exhaust chamber and one of the motor chambers;

(b) a valve plunger slidable in the valve bore and containing an axial bore intersected by four longitudinally spaced lateral ports extending through the plunger, the valve plunger having a first position in which the first and second lateral ports register with the supply chamber and one motor chamber, respectively, and the third and fourth lateral ports register with the other motor chamber and one of the end exhaust chambers, respectively, a second position in which the first and second lateral ports register with said one motor chamber and the other end exhaust chamber, respectively, and the third and fourth lateral ports register with the supply chamber and the other motor port, respectively, and a mid position in which the four lateral ports are isolated from the chambers;

(c) a reciprocable piston actuator in the axial bore;

(d) stop means carried by the valve plunger and positioned adjacent one end of the piston actuator;

(e) a flow control-check valve unit mounted in the axial bore adjacent the other end of the piston actuator and having an end that abuts the actuator, the valve unit being slidable between a first position wherein it abuts the actuator and in which it blocks communication between the first and second lateral ports and a second position in which it opens communication between the first and second lateral ports;

(f) a spring biasing the valve unit toward the piston actuator;

(g) a fifth lateral through port formed in the valve plunger and opening into the axial bore in the region of the abutting ends of the piston actuator and the valve unit;

(h) a sixth lateral through port formed in the valve plunger and opening into the axial bore adjacent the opposite end of the piston actuator, (i) the fifth and sixth lateral ports being so positioned that in the first and second positions of the valve plunger the fifth and sixth ports, respectively, register with the supply chamber.

4. The directional control valve defined in claim 3 in which the valve unit comprises a tubular valve element having one closed end that abuts the actuating piston and containing at least one lateral through port arranged to move into and out of registration with the first lateral port as the valve unit reciprocates in said axial bore.

No references cited.